Patented Sept. 14, 1954

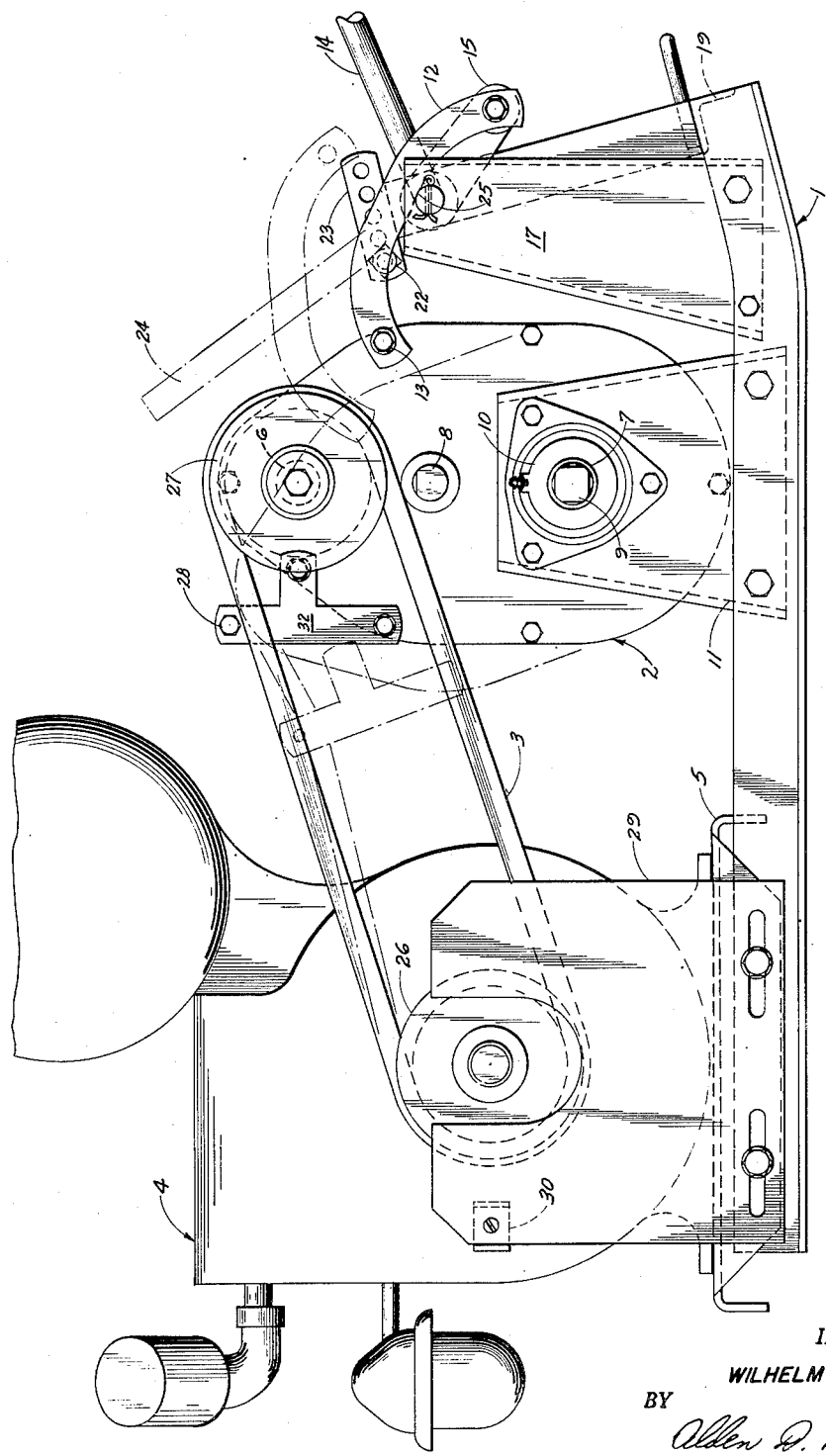

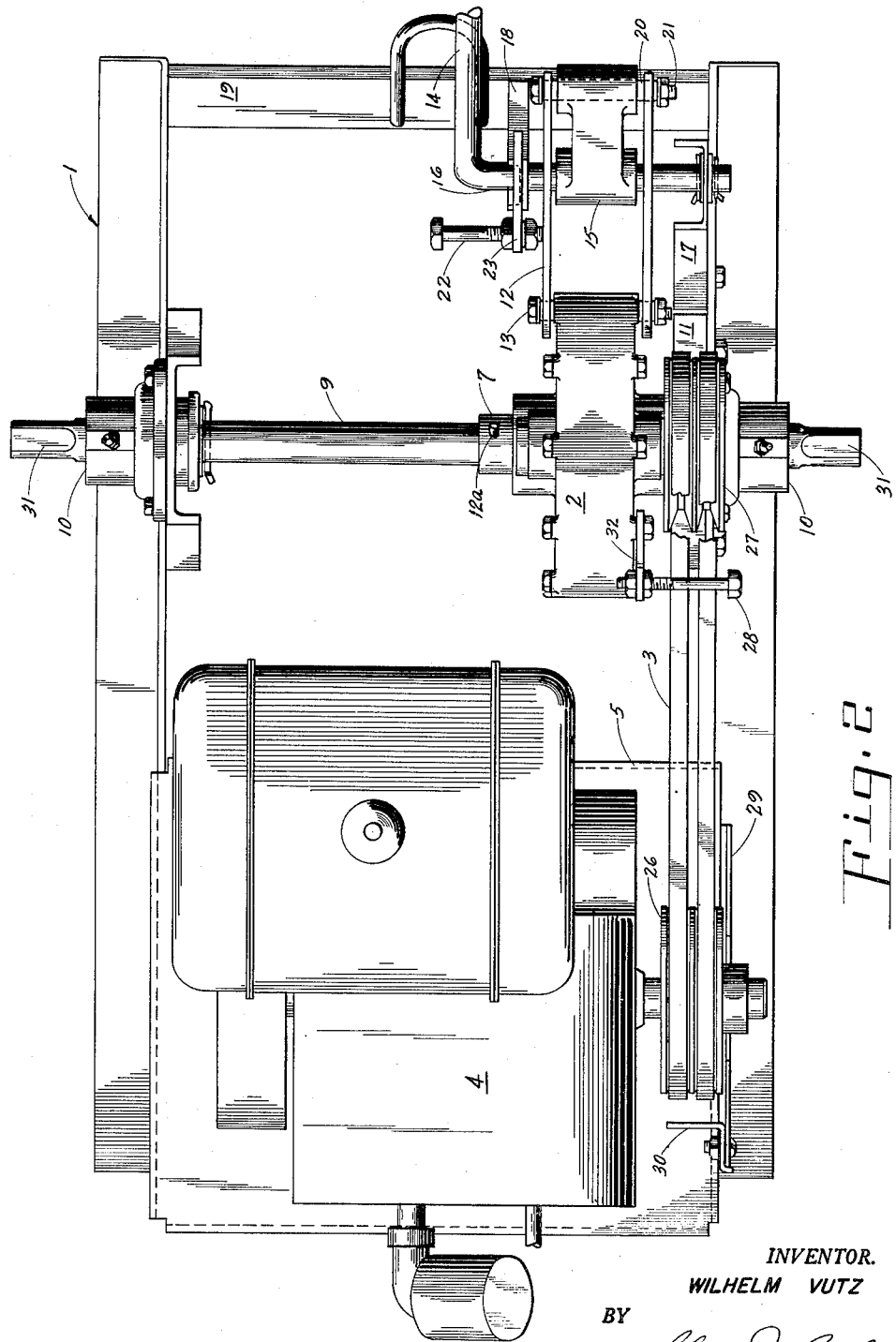

2,688,880

UNITED STATES PATENT OFFICE 2,688,880

POWER TRANSMISSION DEVICE

Wilhelm Vutz, Coldwater, Ohio, assignor to Avco Manufacturing Corporation, Cincinnati, Ohio, a corporation of Delaware Application September 26, 1950, Serial No. 186,756

1 Claim. (Cl. 74—242.15)

The present invention relates to a power transmission and has particular reference to a belt driven reduction gear which may be swung as a unit about its output shaft to permit the application of power as desired to a driven device, such as a portable agricultural elevator.

On American farms today it is common practice to employ portable elevators for raising materials from one level to a higher level such as elevating corn or bales of hay from the ground level into a barn or other receptacle. These elevators may be driven by small gasoline engines or electric motors secured directly to the lateral faces thereof. On the other hand, frequently such an elevator is powered by a belt driven by a pulley secured to the power take-off of a tractor.

Still another method of supplying power to such an elevator involves the use of a small portable transmission which may be driven by a gasoline engine or any other available source of power and which may reduce the speed of the prime mover associated with it to a lower speed which is acceptable for use by the elevator. It is to this last type of equipment that the present invention relates.

A common drawback of transmissions used in the past was the fact that they usually employed a relatively expensive clutch which, when engaged, transmitted power from the prime mover to the elevator. Because of the expense involved in the clutch, such power transmission devices of necessity were relatively expensive and sold in small numbers.

It is therefore an object of the present invention to provide a power transmission mechanism for use with portable elevators which is economical to manufacture.

Another object of the invention is to provide such a power transmission which is compact, light weight, and easily transported from one place to another for use with a wide variety of equipment.

It is also an object of the present invention to provide a power transmission which may be connected to drive an associated piece of equipment without disturbing the alignment of any interconnecting shafts.

Another object of the present invention is to provide a power transmission device which may be regulated by an operator so that power may be transmitted as desired to an associated device without the use of a clutch or similar device.

A particular advantage of the present invention is the fact that it can be readily locked in its operative power transmitting position without concern about inadvertent disconnection from the driven device.

The novel features that are considered characteristic of the invention are set forth in the appended claim; the invention itself, however, both as to its organization and method of operation, together with additional objects and advantages thereof will best be understood from the following description of a specific embodiment when read in conjunction with the accompanying drawings, in which:

Fig. 1 shows an elevational view of the power transmission including a part of a gasoline engine associated therewith; and Fig. 2 shows a top plan view of the power transmission and engine.

As shown particularly well in Fig. 1, the power transmission embodying the teachings of the present invention, is mounted on a transportable base or skid, generally designated 1, on which is adjustably secured a reduction gear unit, generally designated 2. The reduction gear is driven by means of V-belts 3 from a gasoline engine or other prime mover, generally designated 4. The gasoline engine is also adjustably secured to the skid by means of a conventional adjustable mounting plate 5.

The reduction gear, the structural details of which constitute no part of the present invention, includes an input shaft 6, driven by the V-belts 3, which through gearing (not shown) drives a hollow output shaft 7 at a greatly reduced speed. An intermediate shaft 8 projects from the reduction gear and rotates approximately twice as fast as output shaft 7.

A solid shaft 9 passes through hollow shaft 7 and is rotatably positioned by bearings 10 attached to channel shaped brackets 11 which are secured to the sides oft he skid 1. As indicated in Fig. 2, hollow shaft 7 is secured for conjoint rotation to shaft 9 by means of a dowel pin or similar fastening device 12a.

From the foregoing it will be apparent that engine 4 produces rotation of shaft 9 at reduced speed by virtue of the intervening belts 3 and reduction gear 2.

It is common knowledge that a gasoline engine or any similar prime mover cannot be started readily under load without the expenditure of a very large amount of starting energy. Since small engines of the type shown are usually started by hand, it is obviously desirable to unload the engine before it is started, thus simplifying the starting procedure and permitting it to be warmed up properly before applying load to it. For these reasons, a means is provided by this invention for unloading the engine and interrupting the transmission of power to output shaft 9 by means of a mechanism to be presently described.

From the foregoing description, it will be apparent that reduction gear 2 is supported on shaft 9 and can therefore be pivoted about the axis of the shaft. To control such pivotal motion, a pair of similar links 12 are provided which are pivotally secured, as at 13, to the sides of the reduction gear. The position of the links is determined by a manually adjusted handle 14 to which is secured for corresponding movement an intermediate cast link 15. Links 12 and 15 are pivotally connected and form a toggle joint having an over-center locked position in which the reduction gear 2 tightens belts 3 and establishes a driving connection to output shaft 9. The toggle joint also has an inoperative position indicated by phantom lines in Fig. 1. In this position the reduction gear has been swung counterclockwise, thereby slackening belts 3 and interrupting the flow of power to the output shaft.

Handle 14 has a transverse portion 16 which is journaled in brackets 17 and 18, the latter bracket being secured to a transverse brace 19 at the forward end of skid 1.

With particular reference to Fig. 2, it will be noted that links 12 and 15 are pivotally connected by means of a bushing 20 and a bolt 21 which is passed through the bushing to complete the assembly. Since bushing 20 is slightly longer than the aggregate width of the parts through which it passes, bolt 21 may be tightened without binding any of the parts. A similar construction is used at 13 where links 12 are pivotally joined to the reduction gear.

Thus the use of the toggle joint as shown facilitates application of power to shaft 9 whenever desired and permits the engine or other prime mover to be started without the imposition of any load thereon.

It is considered desirable to limit the positions of handle 14 so that the extreme positions of the reduction gear in turn will be limited. This is accomplished by the provision of a stop bolt 22 secured to an adjusting plate 23 which is welded or otherwise secured to the top end of bracket 18. When the belts 3 are slackened, the upstanding portion 24 of handle 14 hits bolt 22, thus limiting its own position as well as that of the reduction gear with which it is associated by means of interconnecting links 12 and 15.

When the belts are tightened and power thereby applied to shaft 9, handle 14 is swung clockwise until the axis of bushing 20 approaches and eventually passes beyond a common line of centers through pivot point 13, the center line of handle portion 16, and the center line of the bushing. Thus, the toggle joint has an over-center position which is determined by the interference of links 12 with horizontal portion 16 of the handle, as indicated at 25.

It has been found in practice that V-belts, such as belts 3, have considerable resilience and that as a result they tend to return to a more or less circular form when slackened by release of the toggle joint. Occasionally, as engine 4 is started, these belts become disengaged from their drive sheaves 26 and 27 associated with the engine and reduction gear, respectively. To prevent this condition a number of guard members are provided. One of these members consists of a bolt 28 secured to a bracket 32 which is mounted on the reduction gear. This bolt extends transversely above the belts. When the reduction gear is swung counterclockwise to slacken the belts, bolt 28 is brought down against the belts as indicated by phantom lines in Fig. 1. A shield 29 is also provided in front of sheave 26 for preventing the belts from coming endwise over the end of the sheave. To shield 29 is secured a Z-shaped bracket 30 which extends transversely behind sheave 26 for preventing the belts from backing out of their grooves when slackened.

From the foregoing description it will be obvious to those skilled in the art that a compact, simple power transmission has been provided having a reduction gear which can be swung about its output shaft to engage or disengage a prime mover from the driven device, which may be an elevator or any other piece of similar equipment. Such disengagement of the prime mover may be effected at any time when the associated equipment need no longer be driven and is particularly helpful when the prime mover is being started.

The elevator is normally driven by a shaft (not shown) which is engaged with one of the square ends 31 provided at the extremities of shaft 9. By providing a double ended output shaft, it is possible to use the device for driving a wide variety of equipment regardless of the direction of rotation required at its input shaft.

The inclusion of shaft 8 also increases the utility of the transmission. If desired, shaft 8 may be used to drive equipment requiring a relatively high speed source of power, higher than the speed attainable by using shaft 9. Should it be desirable to do so, it is also possible to use shaft 8 as an input shaft driven from the power take-off of a tractor. Should this use of the transmission be desired, engine 4 and belts 3 would be eliminated and a sheave would be provided on shaft 8 for engagement with a belt driven by a plulley on the tractor.

From the foregoing description it will be understood that by the adjustment of handle 14 and the associated toggle joint a clutching action may be produced which is exactly the same as that provided by a considerably more intricate and expensive clutch. It will also be understood that the provision of an over-center toggle prevents inadvertent interruption of the flow of power to the output shaft.

It is to be noted that the preferred embodiment of the present invention is so arranged that the reduction gear pivots about the output shaft. This is a highly desirable feature since it avoids any change of position of the output shaft 9 relative to the device which it is driving. In this way, there is no possibility of destroying the alignment of shaft 9 with any member it is driving.

Having described a preferred embodiment of my invention, I claim:

A power transmission comprising a base, a reduction gear unit having an output shaft and an input shaft spaced therefrom, said output shaft being rotatably secured to said base and rotatably supporting said reduction gear unit, a prime mover secured to said base, pulleys secured to said input shaft and said prime mover, endless friction-type driving means engaged with said pulleys for transferring power from said prime mover to said input shaft, a manually rotatable shaft supported by said base, and a toggle joint comprising a curved link interconnecting said manually rotatable shaft and said reduction gear unit whereby said unit can be moved into and out of engagement with said driving means, said curved link positioned to afford an overcenter locked position, said curved link abutting against said rotatable shaft as a stop holding said gear unit pulley in engagement with said endless driving means.

References Cited in the file of this patent

UNITED STATES PATENTS

| Number | Name | Date |
|---|---|---|
| 488,197 | Hackney | Dec. 20, 1892 |
| 665,362 | Bliss | Jan. 1, 1901 |
| 1,978,526 | Eppler, Jr. | Oct. 30, 1934 |
| 2,069,245 | Haines | Feb. 2, 1937 |
| 2,075,297 | O'Brien | Mar. 30, 1937 |
| 2,257,796 | Heineke | Oct. 7, 1941 |
| 2,272,981 | Nelson | Feb. 10, 1942 |
| 2,458,767 | Cooper | Jan. 11, 1949 |
| 2,556,259 | Dorris et al. | June 12, 1951 |
| 2,566,177 | Eustis | Aug. 28, 1951 |
| 2,598,768 | Donald | June 3, 1952 |